(12) United States Patent
Lowrey, Jr.

(10) Patent No.: US 9,764,590 B2
(45) Date of Patent: Sep. 19, 2017

(54) STABILIZED WRITING INSTRUMENT

(71) Applicant: Jack A. Lowrey, Jr., Layton, UT (US)

(72) Inventor: Jack A. Lowrey, Jr., Layton, UT (US)

(73) Assignee: Jack A. Lowrey, Layton, UT (US)

( * ) Notice: Subject to any disclaimer, the term of this patent is extended or adjusted under 35 U.S.C. 154(b) by 132 days.

(21) Appl. No.: 14/791,399

(22) Filed: Jul. 3, 2015

(65) Prior Publication Data

US 2016/0001586 A1 Jan. 7, 2016

Related U.S. Application Data

(60) Provisional application No. 62/020,740, filed on Jul. 3, 2014.

(51) Int. Cl.
| | |
|---|---|
| *B43K 23/004* | (2006.01) |
| *B43K 7/00* | (2006.01) |
| *G06F 3/0354* | (2013.01) |
| *B43K 8/00* | (2006.01) |
| *B43L 15/00* | (2006.01) |
| *B43K 5/00* | (2006.01) |

(52) U.S. Cl.
CPC ............ *B43K 23/004* (2013.01); *B43K 5/005* (2013.01); *B43K 7/005* (2013.01); *B43K 8/003* (2013.01); *B43L 15/00* (2013.01); *G06F 3/03545* (2013.01)

(58) Field of Classification Search
CPC combination set(s) only.
See application file for complete search history.

(56) References Cited

U.S. PATENT DOCUMENTS

| 1,367,872 | A | * | 2/1921 | Glaesser | ................. | B43L 15/00 |
|---|---|---|---|---|---|---|
| | | | | | | 401/6 |
| 2,246,122 | A | | 6/1941 | Brennan | | |
| 2,498,105 | A | * | 2/1950 | Dolan | ..................... | B43L 15/00 |
| | | | | | | 15/437 |
| 2,826,175 | A | * | 3/1958 | O'Connell | ........... | B43K 23/004 |
| | | | | | | 401/6 |
| D187,255 | S | | 2/1960 | Sams et al. | | |
| D191,998 | S | | 12/1961 | Doman | | |
| 4,302,121 | A | * | 11/1981 | Kim | ...................... | B43K 5/005 |
| | | | | | | 401/209 |
| 4,988,065 | A | | 1/1991 | Leban et al. | | |
| D320,076 | S | | 9/1991 | Guthrie | | |
| D323,350 | S | | 1/1992 | Johansson | | |
| D338,633 | S | | 8/1993 | Andre | | |
| 5,320,438 | A | * | 6/1994 | Yang | ..................... | B43K 23/008 |
| | | | | | | 401/6 |
| 5,468,083 | A | * | 11/1995 | Chesar | ................. | B43M 99/006 |
| | | | | | | 15/437 |
| D403,355 | S | * | 12/1998 | Fillion | ............................ | 401/34 |
| 5,897,261 | A | * | 4/1999 | Goetz | .................... | B43K 5/005 |
| | | | | | | 401/209 |
| D416,286 | S | | 11/1999 | Paras et al. | | |

(Continued)

*Primary Examiner* — David Walczak
(74) *Attorney, Agent, or Firm* — Kunzler Law Group, PC

(57) ABSTRACT

A writing instrument that includes and elongate stylus and at least one stabilizer element. The elongate stylus has a distal inscription tip, a body, and a proximal end. The body is interposed between the distal inscription tip and the proximal end. The at least one stabilizer element extends from the elongate stylus in a direction non-parallel to a longitudinal axis of the elongate stylus. The at least one stabilizer element engages a hand of a user in response to the user grasping the elongate stylus.

18 Claims, 5 Drawing Sheets

(56) References Cited

U.S. PATENT DOCUMENTS

| | | |
|---|---|---|
| D443,970 S | 6/2001 | Stucker |
| D611,536 S | 3/2010 | Bridge et al. |
| D666,121 S | 8/2012 | Schmidt |
| D694,666 S | 12/2013 | Lawson, III |
| D707,451 S | 6/2014 | Link |
| 9,067,458 B1 * | 6/2015 | Mock .................. B43K 23/008 |

* cited by examiner

STABILIZED WRITING INSTRUMENT

CROSS-REFERENCES TO RELATED APPLICATIONS

This application claims the benefit of U.S. Provisional Patent Application Ser. No. 62/020,740 filed on Jul. 3, 2014 for Jack A. Lowrey Jr, which is incorporated herein by reference.

FIELD

The subject matter of the present disclosure relates generally to a writing instrument. More specifically, this application relates to a stabilized writing instrument.

BACKGROUND

Writing tools can be difficult to securely grasp. For example, pens, pencils, markers, and other writing tools are generally round and tubular and are thus prone to rotating or moving in the user's hand. Accordingly, a user has to apply a greater gripping force to the writing tool in order to securely grasp and stabilize the writing tool in the user's hand.

SUMMARY

From the foregoing discussion, it should be apparent that a need exists for a writing instrument that overcomes the limitations of conventional writing tools. Beneficially, such a writing instrument would improve the ease and stability of a user's grasp on the writing instrument, thereby promoting a more comfortable writing experience and prolonged writing ability.

The subject matter of the present application has been developed in response to the present state of the art, and in particular, in response to the problems and needs in the art that have not yet been fully solved by currently available writing tools. Accordingly, the present disclosure has been developed to provide a writing instrument that overcomes many or all of the above-discussed shortcomings in the art.

Disclosed herein, according to one embodiment, is a writing instrument that includes and elongate stylus and at least one stabilizer element. The elongate stylus has a distal inscription tip, a body, and a proximal end. The body is interposed between the distal inscription tip and the proximal end. The at least one stabilizer element extends from the elongate stylus in a direction non-parallel to a longitudinal axis of the elongate stylus. The at least one stabilizer element engages a hand of a user in response to the user grasping the elongate stylus.

In one implementation, the at least one stabilizer element extends from the body of the elongate stylus. In such an implementation, a first body portion of the body of the elongate stylus is defined as a segment of the body of the elongate stylus interposed between the distal inscription tip and the at least one stabilizer element and a second body portion of the body of the elongate stylus is defined as a segment of the body of the elongate stylus interposed between the at least one stabilizer element and the proximal end. In another implementation, the at least one stabilizer element extends from the proximal end of the elongate stylus.

In one implementation, at least a portion of an intersection edge between the elongate stylus and the at least one stabilizer element has one or more ergonomic engagement features. For example, the intersection edge between the elongate stylus and the at least one stabilizer element may be filleted. In another implementation, the intersection edge between the elongate stylus and the at least one stabilizer element is beveled or chamfered.

In one implementation, an extension direction of the at least one stabilizer element is substantially perpendicular to the longitudinal axis of the elongate stylus. In another implementation, the at least one stabilizer element includes two stabilizer elements that extend coaxially from opposing lateral sides of the elongate stylus. The at least one stabilizer element may be three stabilizers elements extending from the elongate stylus.

According to one implementation, one of the distal inscription tip and the proximal end may include a digital input tool configured for use with an electronic device having an electronic touchscreen. In such an implementation, the elongate stylus and the at least one stabilizer element may facilitate secure retention of the writing instrument in a conforming reception feature of an electronic device. In another implementation, the distal inscription tip is selected from the group consisting of: an ink roller-ball, an ink delivery nib, and an ink porous tip of fibrous material. In such an implementation, the body of the elongate stylus includes corresponding internal ink storage and/or dispensing mechanisms. In yet another implementation, a cap is detachably engageable with the distal inscription tip.

Also disclosed herein is another embodiment of a writing instrument that includes an elongate stylus and two stabilizer elements. The elongate stylus includes a distal inscription tip, a body, and a proximal end. A first body portion of the body of the elongate stylus is defined as a segment of the body of the elongate stylus interposed between the distal inscription tip and the at least one stabilizer element and a second body portion of the body of the elongate stylus is defined as a segment of the body of the elongate stylus interposed between the at least one stabilizer element and the proximal end. The two stabilizer elements extend coaxially from opposing lateral sides of the elongate stylus. At least one of the two stabilizer elements engages a hand of a user in response to the user grasping the elongate stylus. A portion of an intersection edge between the elongate stylus and the two stabilizer elements includes one or more ergonomic engagement features.

Also disclosed herein is one embodiment of a method for manufacturing a writing instrument. The method includes forming an elongate stylus having a distal inscription tip, a body, and a proximal end, with the body being interposed between the distal inscription tip and the proximal end. The method further includes forming at least one stabilizer element extending from the elongate stylus in a direction non-parallel to a longitudinal axis of the elongate stylus. The at least one stabilizer element engages a hand of a user when the user grasps the writing instrument.

According to one implementation, the method further includes forming a fillet at an intersection edge between the elongate stylus and the at least one stabilizer element. In another implementation, the method includes beveling an intersection edge between the elongate stylus and the at least one stabilizer element. In yet another implementation, the method includes chamfering an intersection edge between the elongate stylus and the at least one stabilizer element.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure. Further, in some instances, well-known structures, materials, or operations are not shown or described in detail to avoid obscuring aspects of the subject matter of the present disclosure. These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

In the following description, numerous specific details are provided. One skilled in the relevant art will recognize, however, that the subject matter of the present application may be practiced without one or more of the specific details, or with other methods, components, materials, and so forth. In other instances, well-known structures, materials, or operations are not shown or described in detail to avoid obscuring aspects of the disclosure.

Illustrated in FIGS. 1-6 are several representative embodiments of a writing instrument that enhances a user's ability to securely and comfortably grasp the writing instrument, as well as embodiments of one or more methods of manufacturing the writing instrument and using the writing instrument. As described herein, the writing instrument provides several significant advantages and benefits over other writing tools. However, the recited advantages are not meant to be limiting in any way, as one skilled in the art may appreciate that other advantages may also be realized upon practicing the present disclosure. Throughout the present disclosure, like numbers refer to like elements (e.g., 110 and 210).

Figure 1:
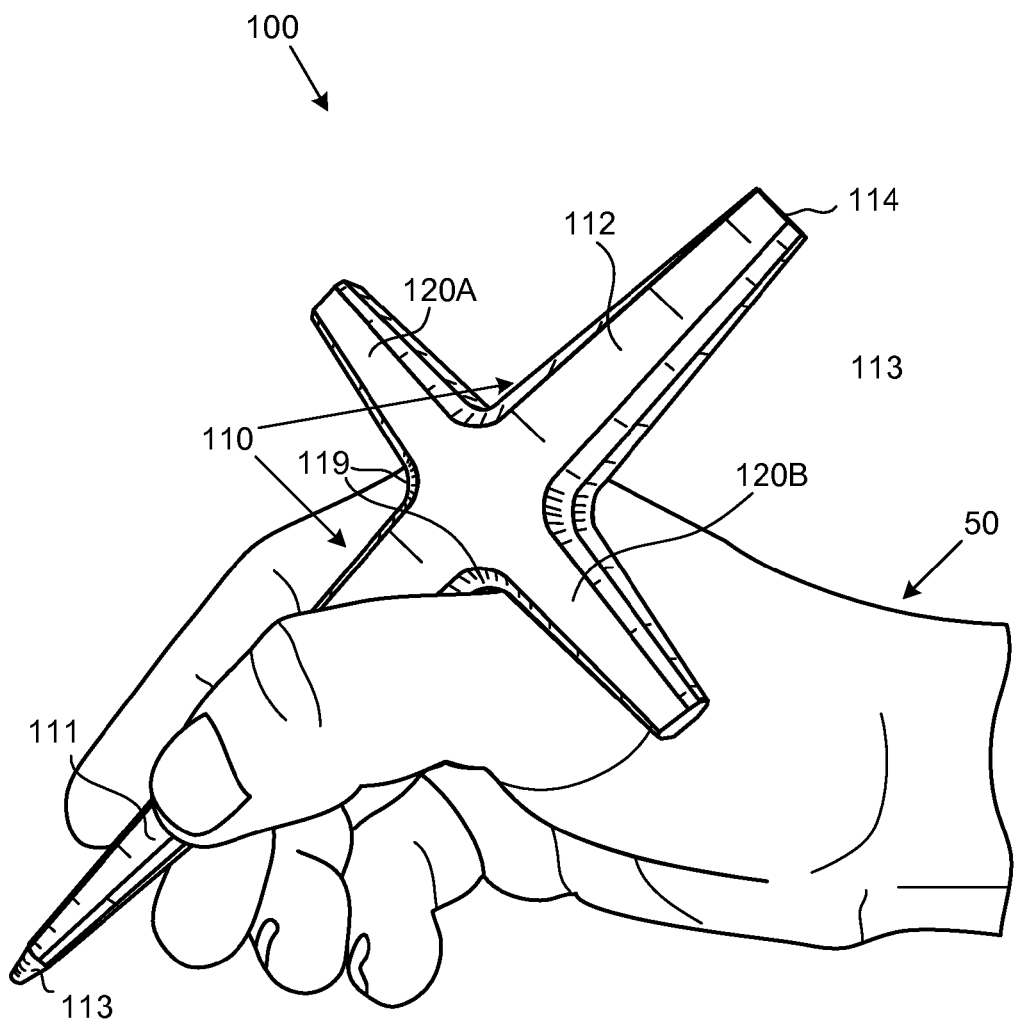
FIG. 1 is a perspective view of a writing instrument in a hand of a user, according to one embodiment.
Figure 2A:
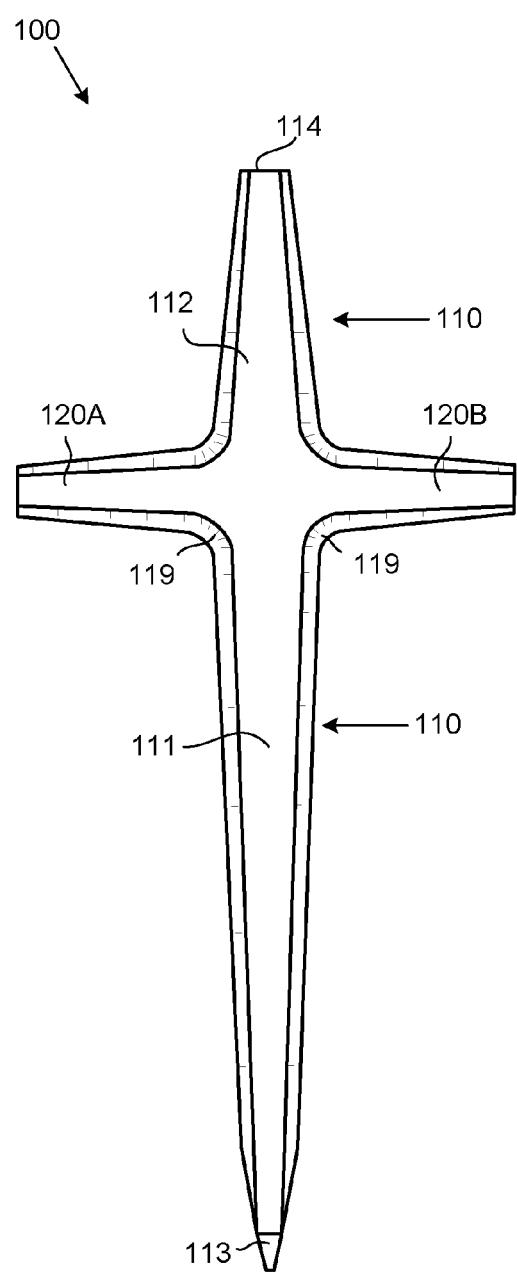
FIG. 2A is a front view of the writing instrument of FIG. 1, according to one embodiment.
Figure 2B:
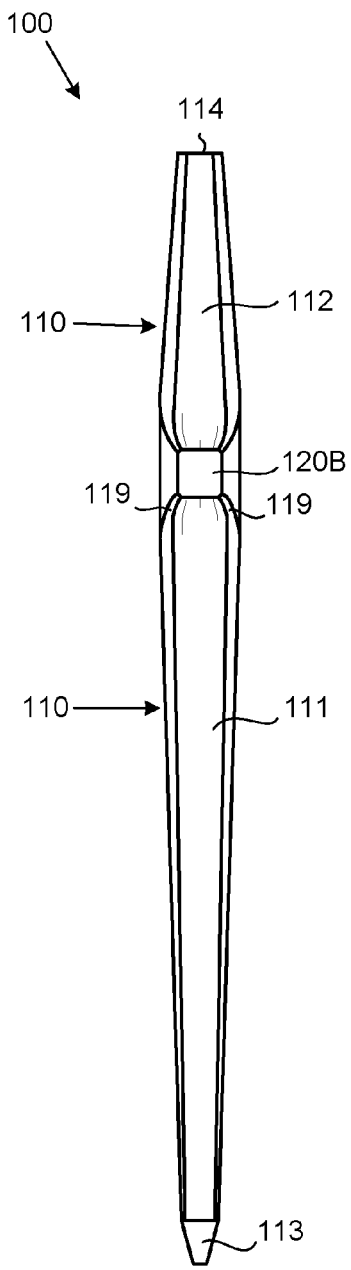
FIG. 2B is a side view of the writing instrument of FIG. 1, according to one embodiment.

FIGS. 1-2B depict a perspective view, a front view, and a side view, respectively, of a writing instrument 100. The writing instrument 100 includes an elongate stylus 110 and two stabilizer elements 120A, 120B. The elongate stylus 110 has a distal inscription tip 113, a body 111, 112, and a proximal end 114. The body 111, 112 is interposed between the distal inscription tip 113 and the proximal end 114. The two stabilizer elements 120A, 120B extend from the elongate stylus 110 in a direction non-parallel to a longitudinal axis of the elongate stylus 110.

An intersection edge 119 is defined where the stabilizer elements 120A, 120B extend from the elongate stylus 110. The extension of the stabilizer elements 120A, 120B from the elongate stylus 110 define a first portion 111 and a second portion 112 of the body of the elongate stylus. The first portion 111 is the segment of the body of the elongate stylus interposed between the distal inscription tip 113 and the stabilizer elements 120A, 120B. The second body portion 112 of the body of the elongate stylus 110 is defined as a segment of the body of the elongate stylus 110 interposed between the stabilizer elements 120A, 120B and the proximal end 114.

Figure 4:
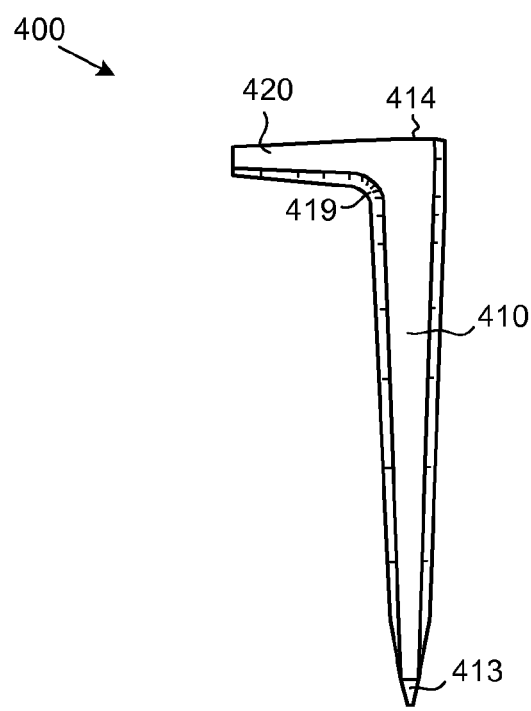
FIG. 4 is a front view of another embodiment of the writing instrument.

Although shown in FIGS. 1-2B as having two stabilizer elements 120A, 120B, in other embodiments the writing instrument 100 may have more than two stabilizer elements (e.g., see FIG. 5) or may have a single stabilizer element (e.g., see FIG. 4). In other words, the writing instrument 100 includes at least one stabilizer element. In one embodiment, the extension direction of the at least one stabilizer element, relative to the longitudinal axis of the elongate stylus 110, is substantially perpendicular to the longitudinal axis of the elongate stylus 110. In another embodiment, however, the angle between the at least one stabilizer element and the longitudinal axis of the elongate stylus 110 may not be 90 degrees and instead may be acute or obtuse, depending on the specifics of a given usage (e.g., the size of a user's hand).

According to the embodiment shown in the figures, the outer-periphery of the elongate stylus 110 and/or the outer periphery of the at least one stabilizer element 120A, 120B is non-circular to further enhance the user's ability to securely grasp and use the writing instrument. However, in another embodiment the outer-periphery of the elongate stylus 110 and/or the at least one stabilizer element 120A, 120B has a rounded shape, similar to that of a conventional writing tool.

The intersection edge 119, as depicted in FIGS. 1-2B, has a beveled/chamfered shape that enhances the ergonomic comfort of grasping the writing instrument. In another embodiment, at least a portion of the intersection edge 119 between the elongate stylus 110 and the stabilizer elements 120A, 120B is filleted (e.g., is partially rounded or curved) in order to further enhance the comfort, stability, and ease of grasping, gripping, and using the writing instrument 100.

The two stabilizer elements 120A, 120B engage the hand 50 of a user in response to the user grasping the elongate stylus 110. For example, the two stabilizer elements 120A, 120B can engage surfaces of the thumb and forefinger to stabilize the writing instrument and prevent inadvertent rotations or slips. In another embodiment, at least one of the stabilizer elements 120A, 120B may be configured to be received between fingers of the hand 50 of the user (e.g., between the forefinger and the middle finger) in response to a user grasping the elongate stylus 110. As mentioned above, the shape of the outer-periphery of the various components (e.g., 110, 120A, 120B) may also improve the user's comfort upon grasping and using the writing instrument 100. For example, various external edges/vertices of the elongate stylus 110 and/or the stabilizer elements 120A, 120B may be filleted, beveled, chamfered, or the like. Additional details relating to the comfort of the writing instrument 100 in the hands of users are included below with reference to FIG. 3.

The distal inscription tip 113 may include any component that can be used for writing or drawing. For example, the distal inscription tip 113 may include a rigid point for carving, or a hollow tip for quill-type writing. In another embodiment, the distal inscription tip 113 tip may include an ink roller-ball, an ink delivery nib, or an ink porous tip of fibrous material. In such implementations, the body of the elongate stylus 110 includes corresponding internal ink storage and/or dispensing mechanisms. In yet another implementation, a cap is detachably engageable with the distal inscription tip 113.

In another embodiment, the distal inscription tip 113 (or the proximal end 114) may include a digital input tool (e.g., a touchscreen stylus) configured for use with an electronic device having an electronic touchscreen. In such embodiments, the elongate stylus 110 and the at least one stabilizer element 120A, 120B may facilitate secure retention of the writing instrument in a conforming reception feature of an electronic device. For example, in one embodiment, the distal inscription tip 113 may comprise an ink tip (e.g., a roller-ball, an ink delivery nib, a porous marker tip of fibrous material, or the like) and the opposite, proximal end 114 may comprise a rubber nub with conductive fibers or the like for use as a stylus with a touchscreen, or the like. In a further embodiment, the proximal end 114 may comprise an attachment element such as a hook, a loop, a clip, or the like for attaching to a lanyard, a necklace, a bracelet, a backpack, or another article of clothing, jewelry, or the like. The writing instrument may be constructed from various materials, including plastic, composite, wood, metal, etc.

Figure 3:
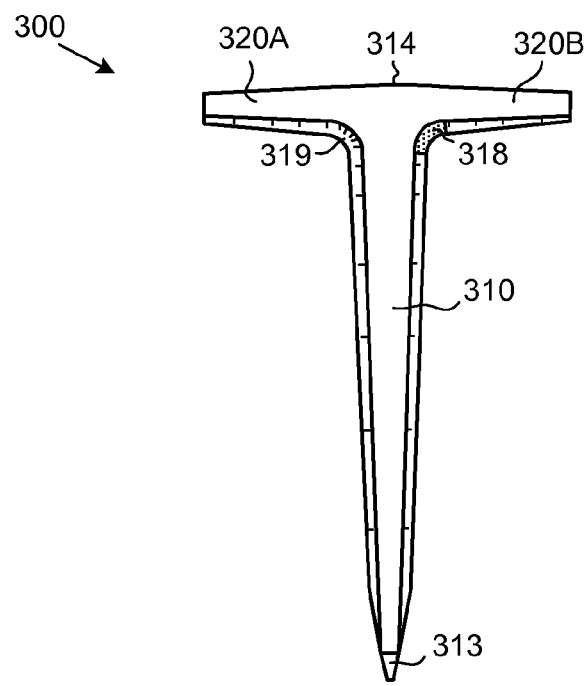
FIG. 3 is a front view of another embodiment of the writing instrument.

FIG. 3 is a front view of another embodiment of the writing instrument 300. The writing instrument 300 shown in FIG. 3 has two stabilizer elements 320A, 320B extending from (or at least from proximate) the proximal end 314 of the elongate stylus 310. The two stabilizer elements 320A, 320B are coaxial and extend from opposing lateral sides of the elongate stylus 310. The intersection edges 319 are beveled and include one or more ergonomic features 318. The one or more ergonomic features 319 may include pads, rubber linings, gel-layers, membranes, etc.

FIG. 4 is a front view of another embodiment of the writing instrument 400. The writing instrument 400 shown in FIG. 4 has a single stabilizer element 420 extending from (or at least from proximate) the proximal end 414 of the elongate stylus 410. The intersection edge 419 may be beveled, chamfered, or filleted (e.g., curved). Although not shown in the figures, in another embodiment the writing instrument may have the elongate stylus 110 as shown in FIG. 1 with the single stabilizer element 420 shown in FIG. 4. In other words, the body of the elongate stylus 110 may include a first portion 111 and a second portion 112 divided in the middle by a single stabilizer element 420.

Figure 5:
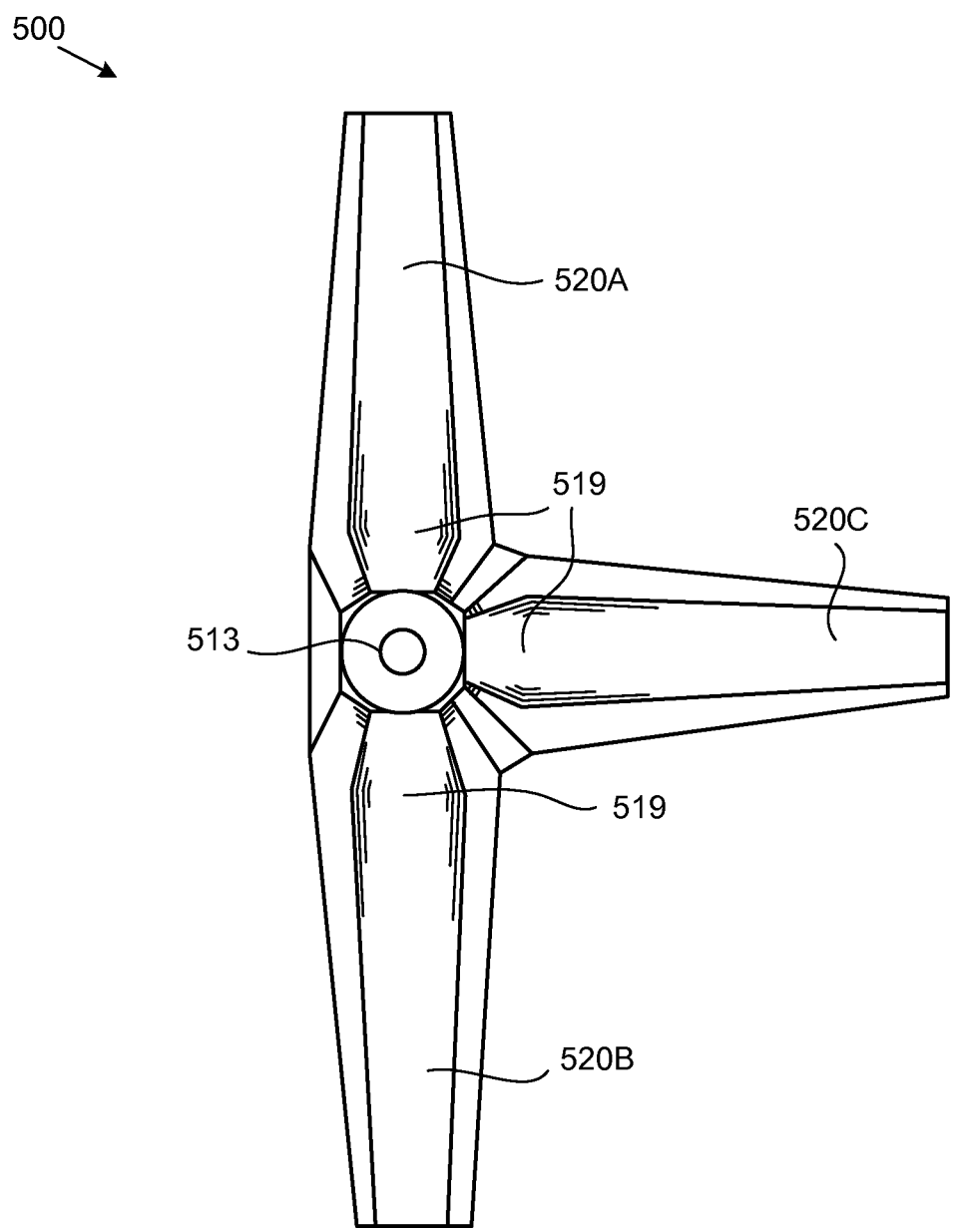
FIG. 5 is a bottom view of yet another embodiment of the writing instrument.

FIG. 5 is a bottom view of yet another embodiment of the writing instrument 500. The writing instrument 500 has three stabilizer elements 520A, 520B, 520C extending from the elongate stylus 510. In such an embodiment, two of the stabilizer elements 520A, 520B extend from opposing lateral sides of the elongate stylus 510 and may engage surfaces of the thumb and fore-finger when the user grasps the elongate stylus 510 while the third stabilizer element 520C extends from the elongate stylus 510 so as to engage the surface of the hand between thumb and forefinger.

The stabilizer elements 520A, 520B, 520C are depicted as being substantially straight shafts that extend outward from the elongate stylus 510. However, it is expected that the stabilizer elements 520A, 520B, 520C may have other designs or configurations. For example, the stabilizer elements 520A, 520B, 520C may be curved so as to wrap at least partially around portions of the hand 50 of the user (e.g., wrap at least partially around fingers or the backhand of the user). Additionally, while the writing instrument 100 embodiment depicted in FIGS. 1-2B has an overall cross-like shape, it is expected that other shapes/designs may be implemented. For example, the overall shape of the writing instrument 100 may resemble a person or an animal, with the elongate stylus 110 resembling the torso and the one or more stabilizer elements resembling appendages (e.g., arms, legs, tails) of the person or animal. In another example, the writing instrument 100 may resemble a tree or other plant.

The writing instrument may also include other, auxiliary features. For example, the writing instrument may include a fastener feature that enables the writing instrument to be connected to a lanyard, keychain, backpack, briefcase, counter, etc. In one embodiment, the writing instrument may include a magnetic member that facilitates attachment of the writing instrument to a magnetic material.

Figure 6:
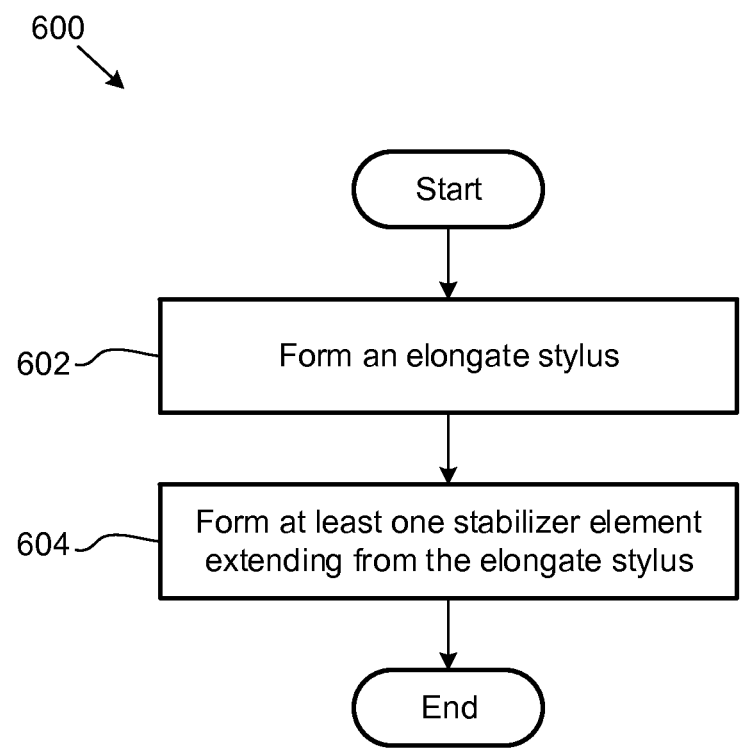
FIG. 6 is a schematic flow chart diagram of a method for making the writing instrument, according to one embodiment.

FIG. 6 is a schematic flow chart diagram of a method 600 for making the writing instrument, according to one embodiment. The method 600 includes forming 602 an elongate stylus having a distal inscription tip, a body, and a proximal end, with the body being interposed between the distal inscription tip and the proximal end. The method 600 further includes forming 604 at least one stabilizer element extending from the elongate stylus in a direction non-parallel to a longitudinal axis of the elongate stylus. The at least one stabilizer element engages a hand of a user when the user grasps the writing instrument.

According to one implementation, the method 600 further includes forming a fillet at an intersection edge between the elongate stylus and the at least one stabilizer element. In another implementation, the method 600 includes beveling an intersection edge between the elongate stylus and the at least one stabilizer element. In yet another implementation, the method 600 includes chamfering an intersection edge between the elongate stylus and the at least one stabilizer element.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A writing instrument comprising:
   an elongate stylus comprising a distal inscription tip, a body, and a proximal end, wherein the body is interposed between the distal inscription tip and the proximal end, a longitudinal axis extends between the distal inscription tip and the proximal end, and the distal inscription tip comprises an ink dispensing tip extending directly from the body; and
   two stabilizer elements comprising substantially straight shafts with terminal free ends, the substantially straight shafts extending outward from opposing lateral sides of the elongate stylus in opposite directions perpendicular to the longitudinal axis of the elongate stylus, the substantially straight shafts extending in the perpendicular directions a greater distance than in a direction along the longitudinal axis of the elongate stylus, wherein the stabilizer elements and the body of the elongate stylus are formed as a single piece, and the at least one of the stabilizer elements engages a hand of a user in response to the user grasping the elongate stylus and wherein the total number of distal inscription tips for the writing instrument is equal to one.

2. The writing instrument of claim 1, wherein the stabilizer elements extend from the body of the elongate stylus.

3. The writing instrument of claim 2, wherein a first body portion of the body of the elongate stylus is defined as a segment of the body of the elongate stylus interposed between the distal inscription tip and the stabilizer elements, wherein a second body portion of the body of the elongate stylus is defined as a segment of the body of the elongate stylus interposed between the stabilizer elements and the proximal end.

4. The writing instrument of claim 1, wherein the stabilizer elements extend from the proximal end of the elongate stylus.

5. The writing instrument of claim 1, wherein at least a portion of an intersection edge between the elongate stylus and at least one of the stabilizer elements comprises one or more ergonomic engagement features.

6. The writing instrument of claim 1, wherein at least a portion of an intersection edge between the elongate stylus and at least one of the stabilizer elements is filleted.

7. The writing instrument of claim 1, wherein at least a portion of an intersection edge between the elongate stylus and at least one of the stabilizer elements is beveled.

8. The writing instrument of claim 1, wherein at least a portion of an intersection edge between the elongate stylus and at least one of the stabilizer elements is chamfered.

9. The writing instrument of claim 1, wherein the stabilizer elements extend coaxially from the opposing lateral sides of the elongate stylus.

10. The writing instrument of claim 1, wherein the proximal end comprises a digital input tool configured for use with an electronic device having an electronic touchscreen.

11. The writing instrument of claim 10, wherein the elongate stylus and the stabilizer elements facilitate secure retention of the writing instrument in a conforming reception feature of an electronic device.

12. The writing instrument of claim 1, wherein the distal inscription tip is selected from the group consisting of: an ink roller-ball, an ink delivery nib, and an ink porous tip of fibrous material, wherein the body of the elongate stylus comprises a corresponding internal ink storage mechanism.

13. The writing instrument of claim 1, wherein the substantially straight shaft comprises front and back planar surfaces.

14. A writing instrument comprising:
   an elongate stylus comprising a distal inscription tip, a body, and a proximal end, wherein the body is interposed between the distal inscription tip and the proximal end, a longitudinal axis extends between the distal inscription tip and the proximal end, and the distal inscription tip comprises an ink dispensing tip extending directly from the body; and
   two stabilizer elements comprising substantially straight shafts with terminal free ends, the substantially straight shafts extending outward coaxially from opposing lateral sides of the elongate stylus in opposite directions perpendicular to the longitudinal axis of the elongate stylus, the substantially straight shafts extending in the perpendicular directions a greater distance than in a direction along the longitudinal axis of the elongate stylus, wherein the stabilizer elements and the body of the elongate stylus are formed as a single piece, at least one of the two stabilizer elements engages a hand of a user in response to the user grasping the elongate stylus, and at least a portion of an intersection edge between the elongate stylus and the two stabilizer elements comprises one or more ergonomic engagement features,
   wherein a first body portion of the body of the elongate stylus is defined as a segment of the body of the elongate stylus interposed between the distal inscription tip and the stabilizer elements, and a second body portion of the body of the elongate stylus is defined as a segment of the body of the elongate stylus interposed between the stabilizer elements and the proximal end and wherein the total number of distal inscription tips for the writing instrument is equal to one.

15. A method for manufacturing a writing instrument, the method comprising:
   forming an elongate stylus comprising a distal inscription tip, a body, and a proximal end, wherein the body is interposed between the distal inscription tip and the proximal end, a longitudinal axis extends between the distal inscription tip and the proximal end, and the distal inscription tip comprises an ink dispensing tip extending directly from the body; and
   forming two stabilizer elements comprising substantially straight shafts with terminal free ends, the substantially straight shafts extending outward from opposing lateral sides of the elongate stylus in opposite directions perpendicular to the longitudinal axis of the elongate stylus, the substantially straight shafts extending in the perpendicular directions a greater distance than in a direction along the longitudinal axis of the elongate stylus, wherein the stabilizer elements and the body of the elongate stylus are formed as a single piece, and the at least one of the stabilizer elements engages a hand of a user when the user grasps the writing instrument and wherein the total number of distal inscription tips for the writing instrument is equal to one.

16. The method of claim 15, further comprising forming a fillet at an intersection edge between the elongate stylus and at least one of the stabilizer elements.

17. The method of claim 15, further comprising beveling an intersection edge between the elongate stylus and at least one of the stabilizer elements.

18. The method of claim 15, further comprising chamfering an intersection edge between the elongate stylus and at least one of the stabilizer elements.

\* \* \* \* \*